United States Patent [19]
Marks

[11] Patent Number: 6,082,512
[45] Date of Patent: Jul. 4, 2000

[54] SELECTABLE ONE WAY STEPLESS CLUTCH

[75] Inventor: Joel Steven Marks, Sherman Oaks, Calif.

[73] Assignee: WorkTools, Inc., Chatsworth, Calif.

[21] Appl. No.: 09/290,927

[22] Filed: Apr. 13, 1999

[51] Int. Cl.[7] .................................................. F16D 11/06
[52] U.S. Cl. .................... 192/43; 192/45.1; 192/54.5; 192/78; 81/59.1
[58] Field of Search .................. 81/59.1; 192/43, 192/45.1, 54.5, 76, 78

[56] References Cited

U.S. PATENT DOCUMENTS

| | | |
|---|---|---|
| 592,213 | 10/1897 | Smith . |
| 2,463,220 | 3/1949 | Van Hoose ............................ 192/45.1 |
| 2,735,324 | 2/1956 | Goldwater et al. . |
| 2,766,648 | 10/1956 | Jazwieck . |
| 3,865,219 | 2/1975 | Dossier . |
| 3,877,556 | 4/1975 | Brownscombe . |
| 4,162,000 | 7/1979 | Zlotek . |
| 4,669,339 | 6/1987 | Cartwright . |
| 4,884,478 | 12/1989 | Lieser . |
| 5,325,947 | 7/1994 | Campbell ............................. 192/54.5 |
| 5,404,773 | 4/1995 | Norville ................................. 81/63.1 |
| 5,482,144 | 1/1996 | Vranish . |
| 5,941,140 | 8/1999 | Suksi ..................................... 81/59.1 |

Primary Examiner—Charles A Marmor
Assistant Examiner—Saúl Rodríguez
Attorney, Agent, or Firm—Paul Y. Feng; Fulwider Patton Lee & Utecht, LLP

[57] ABSTRACT

A stepless ratchet one way clutch mechanism, which provides an improved ratchet tool, is disclosed. A drive head is rotatably fitted into a cylindrical recess in a wrench housing. The drive head includes a partially triangular shape with three flat sides equally spaced around its circumference. A latch is positioned between each flat side and the internal wall of the recess. A selector mechanism provides a rotational bias to the three latches about the rotational axis of the drive head. The drive head may rotate in the wrench in the same direction that the selector is turned. The drive head is prevented from rotating in the opposite direction by wedging the latches between the drive head and the cylindrical internal wall of the recess. The selector bias may be switched either way. When the bias is switched, the latches rotate slightly about the drive head and corners of the drive head contact spaced apart segments of each latch. The selector bias originates within a recess of the drive head while a thin disk links the bias to the latches. A flange of the drive head securely holds the drive head in position and prevents wobble of the drive head. A friction surface is at the latch and internal wall interface. The friction surface may include a "V" groove and rib, a hard, textured surface, or very fine teeth and splines.

20 Claims, 4 Drawing Sheets

SELECTABLE ONE WAY STEPLESS CLUTCH

BACKGROUND OF THE INVENTION

1. Field of the Invention

The present invention relates to mechanical clutches found in a ratchet tool, for example. More precisely, the present invention relates to improvements in a stepless ratchet one way clutch mechanism.

2. Prior Art And Related Information

Ratchet driving tools are well known, both in the form of ratchet wrenches and ratchet screwdrivers. Ratchet wrenches are distinct from ratchet screwdrivers by being of a different shape and importantly, by usually having a heavier construction. The purpose of either tool is similar in that oscillating rotation of a handle causes a drive shaft to progressively rotate. The rotation turns a screw or nut fastener.

Ratchet tools typically function by a toothed pawl engaging splines. The splines are spaced around the either the outside or the inside of a cylindrical surface. In the case of the former the cylindrical surface is part of the drive shaft. In the case of the latter the cylindrical surface is part of the tool body.

An improvement to ratchet tools is a stepless mechanism wherein a wedging action replaces the teeth. Two basic types of stepless actions are known. One design uses discrete rolling elements and transmits torque entirely by containing an efficient expanding force.

A second version is a cam wedge brake which combines a wedging action with friction to transmit torque. Since the desire in a driving tool is to transmit torque rather than to contain an expanding force, a device that combines wedging action with friction will be most effective.

A sprag clutch falls into the category of rolling elements. U.S. Pat. No. 4,162,000 shows a typical sprag clutch. Eccentric shaped sprag elements are held between an inner and an outer circular race. This type of design is quite common in machinery. A variation of the sprag clutch is shown in U.S. Pat. No. 5,482,144. In this design the sprag elements are wedged in two ways; first between the inner and outer races, and second within angled channels of each race. Another rolling element clutch is shown in U.S. Pat. No. 4,884,478. In this screwdriver design three round rollers fit between a cylindrical outer wall and an eccentric rotatable shaft. This differs from the sprag clutch in that the shaft is eccentric rather than the rolling elements. Designs similar to the '478 patent are the most common type mechanism for stepless ratchet hand tools. Either three or four rollers are typical. Another similar design is contained within a wrench handle. U.S. Pat. No. 4,669,339 is distinct from the '478 patent above only in certain details. Balls 56 of the '339 patent provide the direction selecting bias in the same manner shown by ball 48 in FIG. 6 of the '478 patent.

Similar roller type clutches have been known for more than 100 years. U.S. Pat. No. 592,213, from 1897, shows a roller clutch with direction selecting means similar to the above '478 and '339 patents.

To transmit high torques a rolling element clutch must have large numbers of rollers as in a sprag clutch used for machinery, or it must be large in size. The simpler clutch using fewer rollers still requires precision tolerances to achieve limited torque.

Various one way clutches of the friction style are known. For example, U.S. Pat. No. 2,735,324 discloses a stepless ratchet wrench using a wedging brake action. A brake element is forced into a gap between the rotating shaft and housing body. Empirical testing has indicated this design is not effective.

U.S. Pat. No. 2,766,648 shows an improved wedging method. The rotating shaft features a "V" shaped outer circumference. A corresponding V-contoured wedge element presses the shaft in direct proportion to a torque on the handle. The "V" shape functions similarly to an automotive "V" belt, wherein the contact friction is amplified by wedging in the "V." In this case a double wedging action occurs, first from the leverage from the handle, and second from the wedging within the "V."

U.S. Pat. Nos. 3,865,219 and 3,877,556 are similar to each other. A rotatable shaft includes an eccentric cam which forces shoe elements outward to press the inside wall of a housing. Both the '219 and '556 patents disclose embodiments where the shoe to housing interface comprise "V" contoured surfaces. Specifically surfaces 16" in FIG. 6 of the '556 patent, and elements B and P in FIG. 4 of the '219 patent are "V" contoured engagements.

The friction clutches of the '219 and '556 patents present limited suitability as reversible designs. In these two similar references the "shoes" each have a concave recess to fit a convex element of a cam or drive head. The requirement that a shoe concave portion precisely fit a cam convex feature limits the options for a reversible clutch. Specifically, the cam presses the shoe in only one area of the shoe. Therefore, for the cam to press the shoe from an opposing direction the shoe must translate to a substantially different location around the cam. Precisely this method of reversibility is proposed in FIG. 12 of the '219 patent.

In FIG. 12 the shoes are especially small, with adjacent empty space, to allow the large change of position of the shoes required to reverse direction. The shoe will thus be less sturdy than a non reversible design according to the '219 patent. This follows the concept that any empty space in the clutch head assembly is material lost which could otherwise be used for torque transmission, whether it is used in the form of a larger cam or a larger shoe.

A reversible roller type clutch similarly has much empty space to allow for the rollers to move about. Some reversible roller clutches show a direction selecting element filling space. FIG. 10 of U.S. Pat. No. 4,884,478 is a typical example. However, this is not a structural use of the space.

The present invention, in contrast, uses distinct and separated areas of contact between the drive head and the shoe or latch. By shifting the latch only very slightly around the drive head very different force directions may be applied to the latch. There remains very little non-structural space in the assembly.

As stated above, a roller clutch is actually too efficient. Specifically, a roller clutch will convert nearly 100 percent of a torque into an outward spreading force within the wrench housing. Under high torques the wrench head will expand outward causing the wrench action to flex or give. Further, unless the wrench is very large, the rollers will create indentations in the interior of the wrench head at high torques. Empirical observation has shown a ⅜ inch format roller clutch wrench made according to the design of U.S. Pat. No. 4,669,339 to suffer up to 10 degrees of flex at over 60 ft.-lb. of torque, and indentation damage near 150 ft.-lb of torque.

A ⅜ inch ratchet wrench should be stiff and durable to over 200 ft.-lb. of torque. A friction clutch is most effective since it is less efficient in converting torque into spreading force. Instead some of the torque is directly connected to the wrench body through friction. Since much of the spreading force is lost to friction the wrench head will expand less. Therefore, the action will be more solid and durable than with a roller clutch wrench.

Although some of the prior art friction drives may be effective in torque, they all suffer limitations of complexity and direction selecting ability. A sturdy reversible clutch is essential for a ratchet wrench hand tool.

A ratchet wrench in certain respects provides a highly abusive environment for a clutch device. The small device must survive high torques, dirty environments, impact, and non-axial bending. The last environmental condition highlights a deficiency of most prior art stepless ratchet tools. That is, especially in the case of wrenches, the handle is often pulled in and out in addition to around. This can create off axis forces in the drive head which tend to jam a stepless ratchet.

Furthermore, the conventional devices described above do not possess an effective means to hold the drive head securely on axis. The friction drives of the '219 and '556 patents teach no practical method of head retention for a ratchet wrench. Therefore, a need presently exists for a durable, low cost stepless ratchet tool mechanism with a simple means to switch direction.

SUMMARY OF THE INVENTION

The present invention stepless clutch or ratchet mechanism preferably uses a friction or spline engagement around a large portion of a cylindrical surface to transmit high torques in a small package. An additional improvement of the invention is a compact, easy-to-use direction selecting mechanism. A further improvement is the use of non-rolling, wedging elements that are selectively switched when a drive head contacts distinct, spaced areas of the wedging elements. Yet another improvement is the use of a drive head retaining mechanism that protects the mechanism from off axis forces. A still further improvement is the positioning of the selector biasing means within the center of the drive head.

Therefore, the present invention provides a direction selectable, one way clutch with a large torque engagement area. The friction interface can be constructed by a variety of means.

The principle of operation as applied in the present invention comprises a cam which rotates to press outward against braking latches. The latches are similar to a brake shoe, where the latches are surrounded by a drum. The drum in this case is a cylindrical recess inside a circular housing. For the sake of illustration, the present invention clutch is applied to a ratchet wrench, and in this case, the circular housing is a wrench head.

A ratchet wrench must be of small size while transmitting large torque to be useful. A minimal diameter requires the stresses at the friction interface to be spread over the largest possible surface. In the present invention, the interface can include most of the inside circumference surface of the recess. This type of design is superior in contrast with a roller type clutch, where stresses are highly concentrated at each roller.

The height or thickness of a tool is also a large factor in the utility of a ratchet wrench. The drive head must be of substantial thickness to be sturdy. On the other hand, any further structure beyond this essential material merely adds to the bulk of the tool.

Of the conventional stepless ratchet tools that show a mechanism for directional selectability, all require substantial added structure for the selector mechanism. In a preferred embodiment of the present invention, however, the direction biasing force is generated within the body of the drive head. A very thin sheet metal disk or similar structure rests adjacent to a ceiling of the recess. The disk is a link between the biasing device within the wrench head and the latches that surround the wrench head. This concentric packing of the direction selector enables the use of the thinnest possible wrench head.

Reversing the direction causes distinct and spaced portions of each latch to contact the drive head. The total required motion of the latch about the drive head to reverse is minimal. The wrench head can therefore be tightly packed with the structural components of the latches and the drive head. As stated above, the prior art friction and roller clutches cannot provide reversibility in a densely packed, sturdy mechanism.

A variety of interfaces may be used to provide the friction. According to one preferred embodiment, at least one "V" profile groove engages at least one corresponding rib between the latches and the head recess wall. Preferably the groove is cut in the recess wall and the rib is formed as part of the latch. The latch may be made of pressed, powdered metal. In another embodiment, a hard grit friction material is applied to one of the latch or wall. No rib or spline is required in this design. In a further alternative embodiment, an arrangement of conventional ratchet teeth may be used between the latch and wall. In this embodiment, the teeth can be extremely fine because the large engagement area allows many fine teeth to have the necessary strength.

Some type of friction surface is desirable, but not essential, to reduce the required wedging force. A design according to the present invention may use ordinary metal to metal contact as a friction surface. Importantly, the friction surface of each latch contacts the recess wall at angularly spaced positions around the recess wall. This contrasts with a roller type clutch where contact by each roller is at a single longitudinal line of the wall.

Although the exemplary embodiments of the mechanism of the present invention are shown within a ratchet wrench hand tool, other applications for the invention are contemplated. Example applications may include a one way clutch as part of an automobile transmission, a bicycle chain sprocket or other transportation drive component. Other hand or power tools such as power rotary tools or pulley systems could use the clutch of the present invention. Further anticipated uses are as part of stationary machinery equipment.

BRIEF DESCRIPTION OF THE DRAWINGS

FIG. 8A is an isometric view of one embodiment of a ribbed latch.

FIG. 8B is a top plan view of the latch of FIG. 8A.

FIG. 8C is an isometric view of an alternative embodiment ribbed latch.

FIG. 8D is a top plan view of the latch of FIG. 8C.

DETAILED DESCRIPTION OF THE PREFERRED EMBODIMENTS

The present invention is directed to a clutch preferably using a friction or spline engagement around a large portion of a cylindrical surface to transmit high torques in a small package. The present invention clutch has many applications, but for the sake of illustration, it is described in the following as applied to a ratchet wrench.

The principle of operation as applied in the present invention clutch is preferably embodied in a cam which rotates to press outward against braking latches. The latches are similar to a brake shoe, where the latches are surrounded by a drum. The drum in this case is a cylindrical recess in a wrench head.

Figure 1:
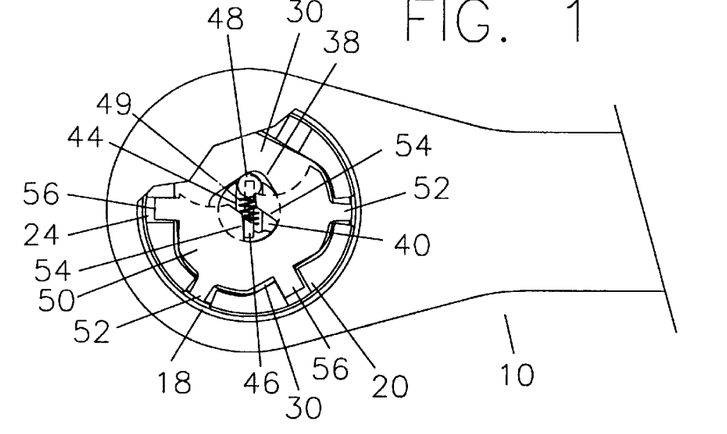
FIG. 1 is a plan view of a preferred embodiment ratchet wrench head showing an assembled clutch mechanism, partly in section.
Figures 2, 2A, 2B:
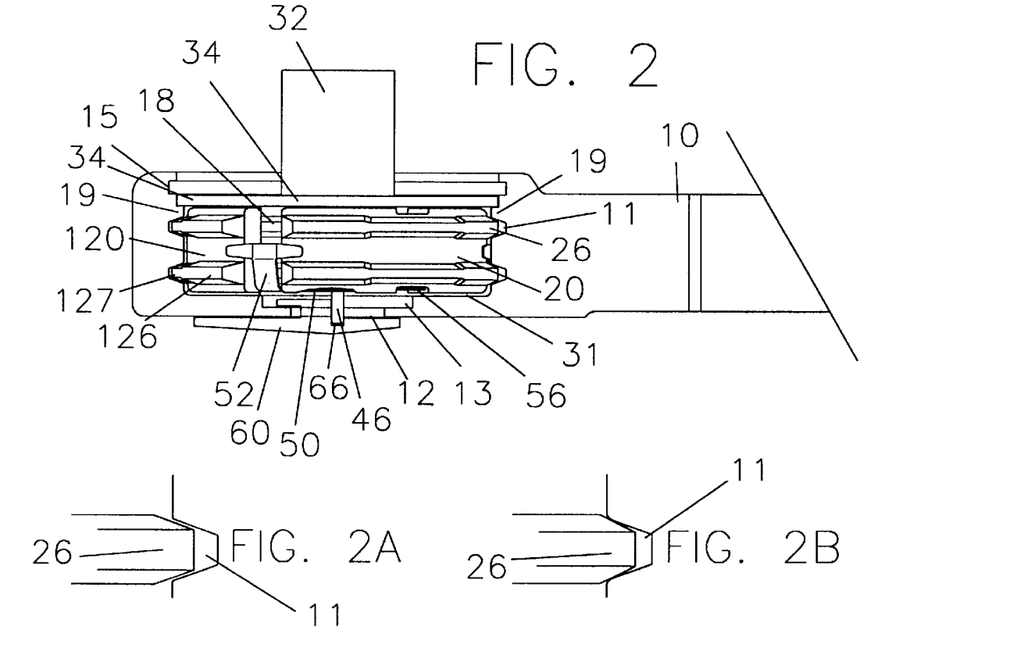
FIG. 2 is a side elevational view, partly in section, of an assembled wrench clutch.
FIG. 2A is a detail view of a parallel rib and groove contact.
FIG. 2B is a detail view of a non-parallel rib and groove contact.
Figure 3:
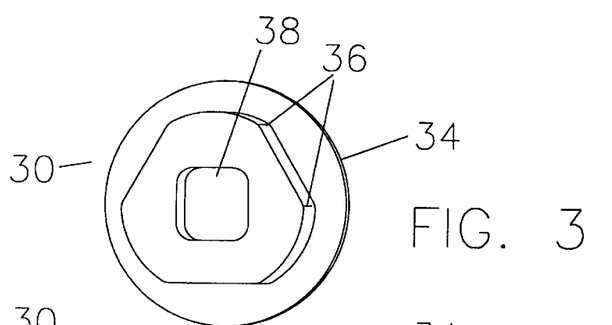
FIG. 3 is a top isometric view of a drive head.
Figure 4:
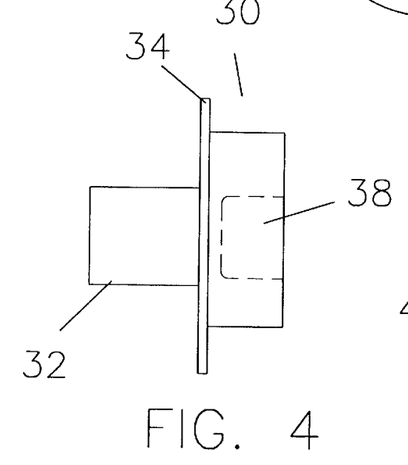
FIG. 4 is a side elevational view of the drive head of FIG. 3.

Specifically, as best seen in FIGS. 1 and 2, recess 18 in a head end of wrench body 10 contains the clutch elements. Recess 18 preferably, but not necessarily, has a closed end. Drive head 30, illustrated in FIGS. 3 and 4, is rotatably fitted into recess 18 of FIGS. 1 and 2. External drive end 32 extends from recess 18 to fit socket tools.

Flange 34 of drive head 30 rests on housing ledge 19, as seen in FIG. 2, so that drive head 30 is spaced from the closed end of recess 18 at gap 31. A snap ring (not shown) is optionally placed into groove 15 at the open end of recess 18 to hold drive head 30 in the assembly. Recess 18 can terminate in an open end with a rotating or non-rotating cap rather than a fixed element of wrench body 10.

Flange 34 provides a large diameter surface to precisely position drive head 30 within recess 18. It is typical of the prior art stepless ratchets that off axis forces will cause some element of the clutch to jam. On the other hand, with flange 34 as part of drive head 30 in the present invention, off axis forces will cause minimal wobble of the drive head. Drive head 30 may be of a single forged and machined piece, or an assembly of parts.

Figure 5:
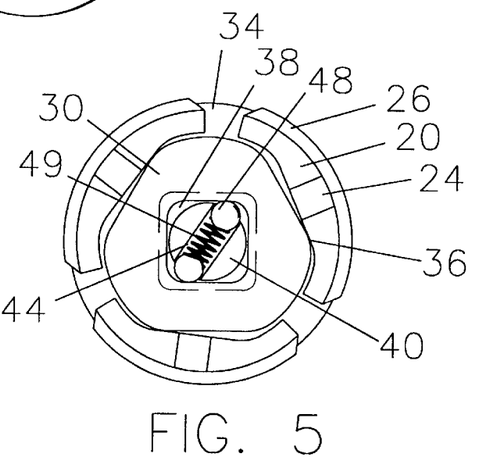
FIG. 5 is a top plan view of some elements of a preferred embodiment clutch assembly.

In the preferred embodiment, three latches 20 shown in FIG. 5 are equally spaced around drive head 30. Latches 20 may be machined or preferably made of pressed powdered metal. In the exemplary embodiment in FIGS. 2 and 5, ribs 26 of latch 20 engage grooves 11 in the walls of recess 18.

The assembly of FIG. 5 illustrates a condition where drive head 30 can rotate clockwise. Thus, a ratchet wrench using drive head 30 of FIG. 5 can install a fastener. In operation, forcing drive head 30 of FIG. 5 counterclockwise wedges latches 20 against the walls of recess 18 by pressing contact area 36. Contact area 36 is formed as a corner at the ends of straight sections of drive head 30. Preferably, contact area 36 is rounded to prevent gouging of latch 20.

Although a particular shape of drive head 30 is not essential, it must at least be non-circular. Likewise the mating surface of latch 20 need not be perfectly straight or flat.

As best seen in FIG. 2 and the detail views of FIGS. 2A and 2B, the friction surface of ribs 26 engage and lock into corresponding grooves 11 in the recess wall. As the wedge angle between drive head 30 and latch 20 is increased, the proportionate outward force by latches 20 increase. A lower friction coefficient between the latches and the recess wall requires a higher outward force to compensate. A higher outward force may be achieved by increasing the wedge angle by, for example, making drive head 30 smaller. If drive head 30 is too small it can become jammed against latches 20.

Figure 6:
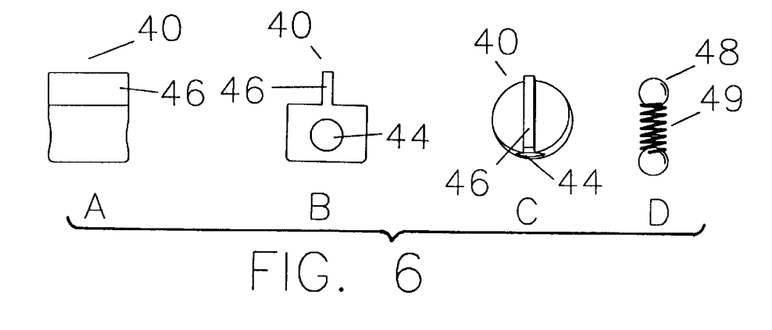
FIG. 6A is a side elevational view of a direction selector post.
FIG. 6B is the post of FIG. 6A rotated 90 degrees.
FIG. 6C is a top isometric view of the post of FIG. 6A.
FIG. 6D is a preferred embodiment selector post biasing assembly.

A biasing mechanism is present to force latches 20 rotationally against drive head 30. In the preferred embodiment, the structures shown in FIGS. 6A–6D generate the biasing force. Balls 48 at opposite ends of compression spring 49 are inserted as an assembly into cavity 44 of switch post 40. In FIG. 5, switch post 40 is shown in section exposing the assembly of balls 48 and spring 49. Preferably, square shaped recess 38 in drive head 30 holds the assembly of FIG. 6. Other shapes for recess 38 may be used.

Under spring 49 bias, balls 48 press outward on the flat walls of recess 38 causing a rotational bias on switch post 40. In FIG. 5, balls 48 are near but not within the corners of square recess 38. If switch post 40 rotates so that balls 48 are in the corners, the rotational bias ceases. In the present invention, the spring biasing force is outward from the center of the drive head, rather than from the side or upward as typical in the prior art clutches. This symmetrical force provides an efficient low friction biasing system.

Tab 46 of switch post 40 is an input feature whereby a user can operate upon switch post 40 to reverse direction. In a reversed counterclockwise direction from FIG. 5, not shown, contact area 36 shifts to a different location on latches 20 corresponding to the corners of drive head 30. Therefore, a small change in relative position of drive head 30 and latches 20 causes a large change in the way drive head 30 presses latches 20.

If switch post 40 is turned counterclockwise in FIG. 5, balls 48 assume an opposite position. The switching operation is described further below.

Balls 48 need, not be a particular shape. For example, in an alternative embodiment (not shown), small cups fitted over each end of spring 49 could press the walls of recess 38. With small cups, a low friction plastic material such as acetyl could be used. Other biasing means may be preferred such as a stressed torsion spring or flat spring within recess 38. An outward biasing force within recess 38 is preferable. However, in an alternative embodiment, the biasing force may originate from other directions. For instance, an upward force may press a cam or a ramp such that the biasing force is ultimately converted to a rotational bias. Preferably the biasing element is contained within a central location of drive head 30.

Figures 11, 12, 13:
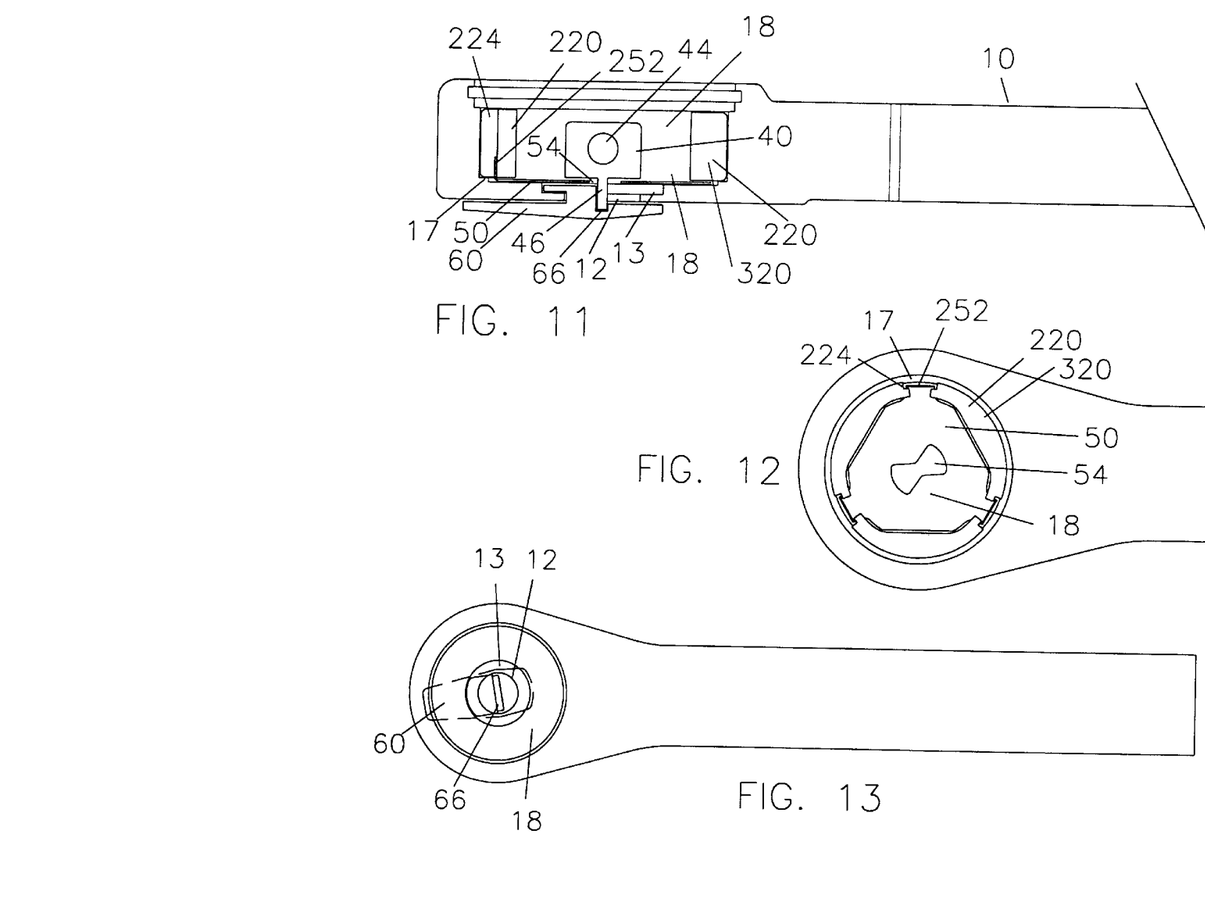
FIG. 11 is a side elevational view, partly in section, of an alternative embodiment wrench partial assembly using the latch of FIG. 9.
FIG. 12 is a plan view of the wrench head of FIG. 11.
FIG. 13 is a plan view of an unassembled wrench body with a switch in position partly hidden.

As seen in FIGS. 2, 11 and 13, opening 12 in the closed end of recess 18 provides access to tab 46 of selector post 40.

Counterbore 13 provides a surface to retain a tab of switch 60 to wrench body 10 to hold switch 60 to the assembly. Counterbore 13 is not required, but provides a way to prevent switch 60 from interfering inside recess 18. Alternatively, switch 60 can be held in opening 12 by a retaining ring fitted into counterbore 13 or by an element of switch 60 being swaged into position. Switch 60 adds leverage to turn tab 46 of post 40. Slot 66 of switch 60 receives tab 46.

Figure 7:
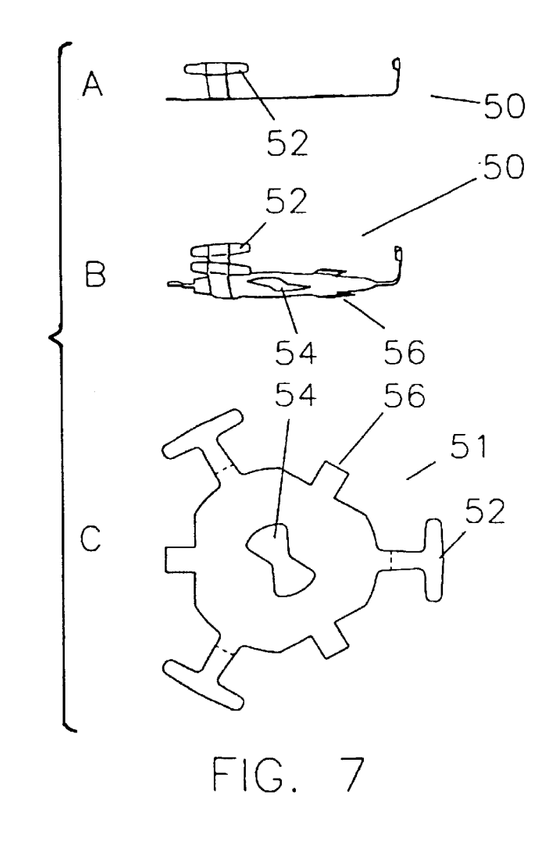
FIG. 7A is a side elevational view of a selector disk.
FIG. 7B is an isometric view of the disk of FIG. 7A.
FIG. 7C is a plan view of a flattened selector disk.

A linkage is required to transmit a bias upon switch post 40 to latches 20. In the preferred embodiment, substantially flat disk 51 shown in the plan view of FIG. 7C provides this linkage. Specifically, FIG. 7C shows an unfinished disk 51 as it looks before forming. FIGS. 7A and 7B are side elevational views of a completed switch disk 50 with bent arms 52.

Opening 54 of switch disk 50 receives tab 46 of switch post 40. A rotational bias on switch post 40 causes tab 46 to press the edges of opening 54. Switch disk 50 is then rotationally biased relative to drive head 30. Radially extending tabs 56 and bent arms 52 of disk 50 engage latches 20. As shown in FIGS. 7A–7C, 8A, and 8B, slot 24 of latch 20 receives tab 56, while arm 52 fits between the ends of latches 20. The position of bent arm 52 in the assembly is best seen in FIG. 2.

Tab 56 of switch disk 50 is intended to transmit the rotational bias of switch post 40 to latch 20. Arm 52 serves some of the same function. However, a primary function of arms 52 is to pull latches 20 gently away from the walls of wrench body recess 18. This design has the advantage of reducing any tendency for latches 20 to catch when the clutch is turned in the freewheeling direction. This may be of particular benefit when drive head 30 and latches 20 are rotated at relatively high speed within recess 18, as may occur when the clutch is used in machinery. Arms 52 counter the tendency for latches 20 to be forced against the walls of recess 18. A further advantage of arms 52 is to help release latches 20 from grooves 11 when the assembly is contaminated with sand or other material. Using tabs 56 alone allows latches 20 to become more easily jammed.

The bias from spring 49 is more than adequate to cause drive head 30 to press latches 20 outward at contact area 36 when the clutch is forced in its opposite lock direction. Either one or both of tabs 56 and arms 52 provide adequate function. The clutch with the present embodiment latch operates best when both features are used. A further embodiment latch 220 described below accommodates only one type of extension from disk 50.

The source of direction bias, post 40, fits within the body of drive head 30. The linkage for the bias, disk 50, fits in the narrow space of gap 31 seen in FIG. 2. The resulting structure is compact, wherein the biasing system adds negligibly to the size of the wrench.

Although the biasing and linking mechanism of the present invention is described in a preferred embodiment in an assembly using friction latches, it would provide the same benefits of compactness and ease of use when used in a roller clutch. Such clutches are disclosed in, for example, U.S. Pat. Nos. 4,884,478 or 4,669,339, or the sprag clutch of U.S. Pat. No. 4,162,000, the entire contents of each of the foregoing being hereby incorporated by reference.

Tab 46 of switch post 40 preferably engages recess 66 in switch 60 atop the head portion of wrench body 10. Switch 60 is seen in a plan view mostly hidden in FIG. 13, and in FIG. 2 as well as in the side elevational, partial section view of FIG. 11 of wrench body 10.

As depicted in FIG. 11, switch 60 is assembled to the wrench by sliding an undercut tab of the switch into counterbore 13. After switch disk 50 and latches 220 are installed, the assembly of the drive head with switch post is inserted into recess 18.

Tab 46 is aligned with opening 54 of disk 50 and with recess 66 of switch 60 as the drive head assembly is inserted. Tab 46 then prevents switch 60 from sliding out of engagement with counterbore 13. The same assembly process applies to the assembly of FIG. 2, including latches 20. Other conventional methods may be used to attach switch 60. Switch 60 may have shapes other than a bar. For example a small star shape may work better as it is less prone to being caught as it spins atop wrench body 10.

Switch 60 and switch post 40 are linked rotationally. As drive head 30 rotates, tab 46 and thus switch 60 rotate with the drive head. In an alternative embodiment, one or more extensions from switch 60 engage notches or recesses in switch post 40. Two pin-like extensions from switch 60 may be preferred over a single elongated tab of switch 60 to fit around through cavity 44 in switch post 40.

To reverse direction, switch 60 is rotated in the same direction that drive head 30 turns. For example, in FIG. 5 switch post 40 is rotated clockwise relative to drive head 30. The free turning direction of drive head 30 is also clockwise in FIG. 5. This is less confusing compared to typical prior art ratchet wrenches where a switch must be rotated opposite to the desired turning direction.

Opening 54 in disk 50 allows some freeplay whereby tab 46 can rotate within opening 54 without immediately engaging opposing edges of opening 54. This allows motion for a snap action of balls 48 in square recess 38. The rotation required of disk 50 is slight when reversing direction. The contact angle between latches 20 and drive head 30 seen in FIG. 5 is one half of the total disk rotation. An equal but opposite angle results when the direction is reversed. At the same time balls 48 and switch post 40 must preferably turn by a greater angle in square recess 38 for the snap action. The freeplay required as a result of this angle discrepancy is provided by the shape of opening 54.

FIGS. 9, 10, 11 and 12 show an alternative embodiment of a disk to latch engagement. Arm 252 of a disk is shown. In FIGS. 11 and 12, notch 224 of latch 220 receives arm 252 of a switch disk. Arm 252 is similar to arm 52 described above, except that the two opposing extended tabs of arm 52 may not be needed in arm 252. At the bottom of recess 18 in FIGS. 11 and 12, circumferential ledge 17 holds latch 220 away from the bottom, closed end of recess 18. Notch 224 and ledge 17 thus cause a gap so that arm 252 can extend to the outside of latch 220. Arm 252 provides both rotational and inward force to latch 220 in a manner similar to arm 52.

The design of latch 220 differs from the other latch embodiments disclosed here in that the contours and features of latch 220 are all formed in one direction. Latch 220 can therefore be made by cutting sections from an elongated extruded or rolled metal bar. Under certain conditions, as described below, this forming method may be most efficient.

Various designs are possible for the latches of the present invention. Latch 20 and 120 are identical except for the rib design. In latch 20 a continuous rib 26 is used. The arc of rib 26 may be varied. A larger arc causes rib 26 to contact the grooves of recess 18 at each end of latch 20. This may be desirable to provide a firm locking action since the outer portions of the latch wedge into the walls of recess 18 more strongly than the central portion of the latch near slot 24. This is best when the friction engagement is low, as when the wedge angle of rib 26 and corresponding groove 11 angle are large.

As the clutch torque increases, latch 20 with a large arc flexes slightly and the contact between ribs 26 and recess 18 progresses inward along latch 20, providing a large contact surface. A smaller arc causes the central rib portion to make contact. This may be best with high friction as when the wedge angle of rib 26 and corresponding groove 11 angle are small. Here a rocking action may help disengagement.

In the exemplary embodiment, the rib and groove angle need not be perfectly matched. For example, as represented in FIG. 2B, rib 26 may form a total angle of 40 degrees while the grooves may be at 35 degrees. This creates a minute gap along part of the contact surfaces. Advantageously, the gap more easily sheds particulate contamination. A concentrated pressure at the contact area prevents an oil film from degrading the friction and prevents lockup from oil surface tension at the contact interface. Since the angles are not too different, the total contact area remains large enough to prevent wear. Moreover, the corner contact also helps wear-in since a small portion wears relatively fast to allow for slight mismatch in the spacing of grooves 11 relative to ribs 26. The angle mismatch also helps increase tolerance of off axis wobble of drive head 30. Related misalignments between latches 20 and the grooves are accommodated by the intentionally imperfect angular fit of ribs 26 into the grooves.

A similar non-parallel contact may be achieved when one or both the rib and groove contact surfaces are arcuate in section so that the relative angle of engagement varies within a set quantity depending on the radial distance from the head center. FIG. 2B shows rib 26 contacting the groove at a different angle from the groove, with a radiused corner of the groove being the contact location. FIG. 2A shows a parallel contact, with the rib spaced from the groove for clarity.

In a further variation one or both of rib 26 and groove 11 may be patterned or textured to provide very small channels or cavities for contamination to be shed. A texture also may help the mating parts to wear more evenly.

As seen in FIGS. 8C and 8D, latch 120 has slot 124 similar in function to slot 24 of latch 20 shown in FIGS. 8A and 8B. However, the rib comprises separate sections 126 and 127, as shown in FIGS. 8C and 8D. Rib 127 is narrow and cannot contact a groove in recess 18. Rather than remove optional rib 127 entirely, it remains part of the structure to add strength to latch 120. Contact is limited to rib 126 at each end of latch 120. By this design, slight variations in the arc of latch 120 or the grooves in recess 18 should not cause the contact area to shift greatly. Specifically, the central portion of latch 120 cannot make contact.

Figures 8, 9, 10:
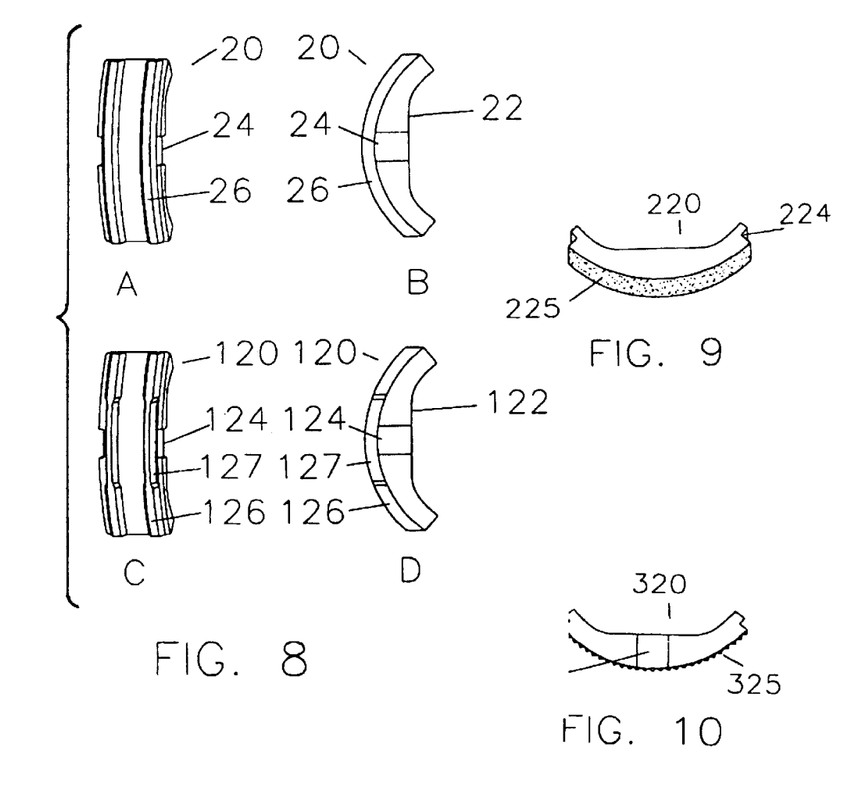
FIG. 9 is an isometric view of a latch coated with hard grit.
FIG. 10 is a top plan view of a fine toothed latch.

As seen in FIG. 9, alternative embodiment latch 220 uses a textured friction surface 225 instead of ribs and grooves. The friction material may comprise carbide grit bonded by brazing to latch 220, or other frictional materials known in the art. This design may simplify manufacture of the wrench by eliminating the need for cutting grooves in recess 18. Also, a long bar shape can be coated with grit and then cut off to short lengths. Latches 220 do not have to be individually formed.

FIG. 10 depicts another alternative embodiment latch 320. Slot 324 functions similarly as slot 24 of latch 20. Latch 320 provides a conventional tooth ratchet action. Latch 320 fits into recess 18, where recess 18 has corresponding inside teeth, not shown. An advantage over conventional ratchet wrenches is that the teeth can be extremely fine, for example 200–300 teeth per revolution, verses 30 to 70 in a conventional wrench, because of the large contact area inherent in the clutch design of the present invention. Latch 320 is shown in a configuration similar to latch 20. The same forming method as used for latch 220 may be used here, with the exception that slot 324 would not be present. A design using latch 320 with the cut off forming method may be the most economical version of the present invention since latch 320 does not require coating in the manner of latch 220 of FIG. 9.

According to the disclosed embodiments of latches, each has certain advantages. The rib and groove design of latch 20 and 122, shown in FIGS. 8A–8D, provide the quietest and smoothest stepless action. The grit design of latch 220 provides a stepless action, although with some sound. The grit version may be less sensitive to manufacturing or other variables. The toothed design of latch 320 is likely the lowest cost version; although the action can be very fine, it is not literally stepless.

As seen in FIG. 5, even though three latches 20 are preferred, two, four, or more may be used. Furthermore, the term "stepless" is intended to include the very fine tooth design described above. All of the above latches are distinct from rollers in that each latch contacts the circumferential wall of recess 18 in a continuous manner, or at least at multiple locations of each latch.

From the foregoing detailed description, it will be evident that there are a number of changes, adaptations and modifications of the present invention which come within the province of those skilled in the art. However, it is intended that all such variations not departing from the spirit of the invention be considered as within the scope thereof as limited solely by the following claims.

What is claimed is:

1. A stepless ratchet one way drive mechanism including an elongated housing with a transverse cylindrical recess and a drive head rotatably held in the cylindrical recess, the combination comprising:

a plurality of latches positioned around a rotation axis of the drive head, the latches being between the drive head and a circumferential interior wall of the cylindrical recess, wherein at least two latches are spaced around the drive head and the drive head includes a partially triangular shape;

non-circular portions of the drive head defining corners which contact localized areas of each latch;

the drive head corners pressing a first contact area of each latch when the latches are biased about the drive head in a first rotational direction and the drive head is forced in a second rotational direction, the drive head and the latches being locked against rotating in the second rotational direction, and the drive head being free to rotate along with the latches in the first rotational direction;

the drive head corners pressing a second contact area of each latch when the latches are biased about the drive head in the second rotational direction and the drive head is forced in the first rotational direction, the drive head and the latches being locked against rotating in the first rotational direction, and the drive head being free to rotate along with the latches in the second rotational direction;

the first contact area and the second contact area of each latch being spaced apart; and an outer friction surface of each latch facing away from the drive head and each latch friction surface contacting the interior wall of the cylindrical recess.

2. The stepless ratchet combination of claim 1, wherein the friction surface includes a rib and groove engagement.

3. The stepless ratchet combination of claim 1, wherein the friction surface includes a hard, textured material.

4. The stepless ratchet combination of claim 1, wherein the friction surface includes a fine tooth engagement.

5. The stepless ratchet combination of claim 1, wherein the drive head includes a recess within a central portion of the drive head, and the drive head recess contains a spring biasing mechanism, with the spring biasing mechanism being linked to the latches.

6. The stepless ratchet combination of claim 5, wherein the biasing mechanism is linked to the latches by a thin disk, and the disk includes extensions to engage the latches.

7. The stepless ratchet combination of claim 6, wherein the housing cylindrical recess terminates in a closed end, and an end of the drive head is spaced from the recess closed end by a gap, and the thin disk fits within the gap.

8. The stepless ratchet combination of claim 1, wherein the drive head includes an enlarged diameter flange, and the flange is rotatably retained at an open end of the cylindrical recess.

9. A stepless ratchet reversible one way drive mechanism including an elongated housing with a transverse cylindrical recess and a drive head rotatably held in the cylindrical recess, the combination comprising:

an interior end of the drive head including an interior face of the drive head facing into the cylindrical recess, and an exterior end of the drive head extending from an open end of the cylindrical recess;

a plurality of locking elements positioned around a rotation axis of the drive head, the locking elements being between the drive head and an interior wall of the cylindrical recess;

the locking elements including latches, each latch having an outer friction surface facing away from the drive head, and each latch friction surface contacting the interior wall of the cylindrical recess at angularly spaced positions around a circumference of the interior wall, and wherein non-circular portions of the drive head define corners which contact localized areas of inward facing surfaces of each latch;

wherein the drive head corners press a first contact area of each latch when the latches are biased about the drive head in a first rotational direction and the drive head is forced in a second rotational direction, the drive head and the latches being locked against rotating in the second rotational direction, and the drive head being free to rotate along with the latches in the first rotational direction;

wherein the drive head corners press a second contact area of each latch when the latches are biased about the drive head in the second rotational direction and the drive head is forced in the first rotational direction, the drive head and the latches being locked against rotating in the first rotational direction, and the drive head being free to rotate along with the latches in the second rotational direction;

wherein the first contact area and the second contact area of each latch are spaced apart;

a resilient biasing member located in a cavity of the drive head;

a thin selector disk adjacent to the interior face of the drive head, the selector disk substantially defining a plane perpendicular to a rotation axis of the drive head;

the selector disk linked to the biasing member to cause the selector disk to have a rotational bias about the drive head rotation axis;

an outer portion of the selector disk engaging the locking elements whereby the locking elements are rotationally biased about the drive head rotation axis;

an eccentric engagement between the locking elements, the drive head, and the interior wall causing the locking elements to become wedged between the drive head and the interior wall of the cylindrical recess when the locking elements are biased in a selected rotational direction about the drive head rotation axis and a torque is applied to the drive head about the drive head rotation axis.

10. The stepless ratchet combination of claim 9, wherein the cavity of the drive head includes a plurality of corner vertices in a section across the drive head rotation axis.

11. The stepless ratchet combination of claim 10, wherein the post includes a through hole, and a compression spring with two sliding members at each end is within the through hole, and the sliding members press flat walls of the cavity in the drive head.

12. The stepless ratchet combination of claim 9, wherein the selector disk outer portion includes extended arms, and the arms engage the locking elements.

13. The stepless ratchet combination of claim 12, wherein at least some of the extended arms bias the locking elements away from the interior wall of the cylindrical recess.

14. A ratchet one way drive mechanism including an elongated housing with a transverse cylindrical recess and a drive head rotatably held in the cylindrical recess, the combination comprising:

the drive head including an interior end substantially surrounded by the cylindrical recess and an external end extending outward from an open end of the cylindrical recess;

an extended flange around the drive head, the flange located between the interior end and the external end of the drive head;

the flange having a substantially circular outer perimeter;

the flange closely fitted at the cylindrical recess open end, an interior face of the flange positioned by a circumferential ledge of the cylindrical recess;

a removable retaining element secured in a notch of the cylindrical recess, the retaining element facing an exterior face of the flange; and wherein the drive head is prevented from moving into the cylindrical recess by the flange pressing the ledge.

15. The ratchet combination of claim 14, wherein the drive head interior end is spaced from a surface of the cylindrical recess.

16. The ratchet combination of claim 14, wherein a plurality of locking elements are positioned around a rotation axis of the drive head, the locking elements being between the drive head and an interior wall of the cylindrical recess.

17. The ratchet combination of claim 16, wherein the locking elements comprise latches each including an outer friction surface of each latch facing away from the drive head and each latch friction surface contacting the interior wall of the cylindrical recess at angularly spaced positions around the circumferential interior wall;

non-circular portions of the drive head define corners which contact localized areas of inward facing surfaces of each latch;

the drive head corners press a first contact area of each latch when the latches are biased about the drive head in a first rotational direction and the drive head is forced in a second rotational direction, the drive head and the latches being locked against rotating in the second rotational direction, and the drive head being free to rotate along with the latches in the first rotational direction;

the drive head corners press a second contact area of each latch when the latches are biased about the drive head in the second rotational direction and the drive head is forced in the first rotational direction, the drive head and the latches being locked against rotating in the first rotational direction, and the drive head being free to rotate along with the latches in the second rotational direction;

the first contact area and the second contact area of each latch are spaced apart.

18. The ratchet combination of claim 17, wherein the friction surface includes a rib and groove engagement.

19. The ratchet combination of claim 17, wherein the friction surface includes a hard, textured, material.

20. The ratchet combination of claim 17, wherein the friction surface includes a fine tooth engagement.

* * * * *